(12) United States Patent
Kolacz et al.

(10) Patent No.: US 11,609,479 B2
(45) Date of Patent: Mar. 21, 2023

(54) BULK PROPERTY FEEDBACK FOR LIQUID CRYSTAL-CLAD WAVEGUIDES

(71) Applicant: The Government of the United States of America, as represented by the Secretary of the Navy, Arlington, VA (US)

(72) Inventors: Jakub Kolacz, Washington, DC (US); Henry G. Gotjen, Washington, DC (US); Christopher M. Spillmann, Annandale, VA (US); Jawad Naciri, Arlington, VA (US); Jason D. Myers, Alexandria, VA (US); Jesse A. Frantz, Washington, DC (US); Robel Y. Bekele, Washington, DC (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 295 days.

(21) Appl. No.: 17/036,675

(22) Filed: Sep. 29, 2020

(65) Prior Publication Data

US 2021/0286231 A1 Sep. 16, 2021

Related U.S. Application Data

(60) Provisional application No. 62/908,140, filed on Sep. 30, 2019.

(51) Int. Cl.
*G02F 1/365* (2006.01)
*G02F 1/295* (2006.01)
*G02F 1/03* (2006.01)

(52) U.S. Cl.
CPC ............ *G02F 1/365* (2013.01); *G02F 1/0316* (2013.01); *G02F 1/2955* (2013.01); *G02F 2202/40* (2013.01)

(58) Field of Classification Search
None
See application file for complete search history.

(56) References Cited

U.S. PATENT DOCUMENTS

| 5,748,825 A * | 5/1998 | Rockwell, III ........ G02B 6/032 385/126 |
| 9,366,938 B1 * | 6/2016 | Anderson ............. G02F 1/2955 |
| 9,897,892 B2 * | 2/2018 | Auxier .................. G02F 1/0118 |
| 2018/0024413 A1 | 1/2018 | Frantz et al. |

(Continued)

FOREIGN PATENT DOCUMENTS

WO WO-2005038497 A2 * 4/2005 ........... C09K 19/544

OTHER PUBLICATIONS

Shi and Bos "Liquid Crystal Based Optical Phased Array for Steering Lasers" AFRL-RY-WP-TR-2009-1315, Air Force Research Laboratory, Oct. 2009.

*Primary Examiner* — Rhonda S Peace
(74) *Attorney, Agent, or Firm* — US Naval Research Laboratory; Roy Roberts

(57) ABSTRACT

A liquid crystal (LC) beam steerer includes a waveguide apparatus with a waveguide having a high-index core in contact with a variable-index liquid crystal (LC) cladding, wherein a voltage applied to the LC cladding is effective to steer a beam of light passing through the high-index core. Measuring the bulk birefringence and/or the capacitance characteristics of the LC can facilitate beam steering.

10 Claims, 7 Drawing Sheets

(56) References Cited

U.S. PATENT DOCUMENTS

| | | | |
|---|---|---|---|
| 2019/0204711 A1* | 7/2019 | Myers | G02F 1/292 |
| 2020/0241381 A1* | 7/2020 | Kim | G02F 1/2955 |
| 2021/0286231 A1* | 9/2021 | Kolacz | G02F 1/2955 |

* cited by examiner

BULK PROPERTY FEEDBACK FOR LIQUID CRYSTAL-CLAD WAVEGUIDES

CROSS-REFERENCE TO RELATED APPLICATIONS

This application claims the benefit of U.S. Provisional Patent Application No. 62/908,140 filed Sep. 30, 2019, the entirety of which is incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing NC 109924.

BACKGROUND

Nematic Liquid Crystal (NLC) is a phase of matter characterized by rod shaped molecules that exhibit long range orientational order described by a local director n̂ and an elastic response to deformation. Due to the structure of the constituent molecules, NLCs commonly exhibit dielectric anisotropy ($\Delta\varepsilon$) and birefringence ($\Delta n$). They find use in NLC-based electro-optic devices such as displays, light (phase, amplitude, polarization) modulators [1-3], phased arrays [4], polarization gratings [5-7], and refractive steerers [8-10].

The elastic response of NLC can be modeled using elastic constants ($K_{ii}$), which are limited by the symmetry of the director to three terms: splay ($K_{11}$), twist ($K_{22}$) and bend ($K_{33}$). The confinement geometry can be further used to eliminate the twist deformation, in which case the elastic free energy, $f_{el}$, can be written as:

$$f_{el} = \frac{1}{2}K_{11}(\nabla \cdot \hat{n})^2 + \frac{1}{2}K_{33}(\hat{n} \times \nabla \times \hat{n})^2$$

At interfaces, NLCs have an energy contribution, $f_s$, that stems from the anchoring energy (W) and induced pretilt angle ($\theta_s$):

$$f_s = \frac{1}{2}W\sin^2(\theta - \theta_s)$$

In the case where NLCs exhibit dielectric anisotropy ($\Delta\varepsilon \neq 0$), an applied field (E) across the molecules results in an additional free energy term:

$$f_E = \varepsilon_0 \Delta\varepsilon^2 \sin\theta \cos\theta$$

which distorts the NLC director when above a threshold voltage $V_{th}$ [11]. The resulting orientation of the molecules is a continuous function that is dominantly influenced by the surface at the interfaces and by the applied field in the center. The orientation of liquid crystal (LC) molecules through the entirety of the LC cell can be modeled by computationally minimizing the total energy of the system, which is illustrated in FIG. 1B for varying voltages.

In traditional applications, NLC cells are utilized in either the transmissive or reflective state and therefore the optical properties are mostly determined by the orientation of the bulk LC:

$$\Delta n = n_{eff} - n_o = n_e n_o \int \frac{dz}{\sqrt{n_e^2 \sin^2\theta(z) + n_o^2 \cos^2\theta(z)}} - n_o$$

As a result, relatively low voltages are needed to change the total optical properties of devices, which lead to very low-power displays. In general, the measurable birefringence is actually weighted by the strength of field in each voxel of the NLC. Thus a more accurate description uses a weighting function w(z)

$$\Delta n = n_{eff} - n_o = n_e n_o \int \frac{w(z)dz}{\sqrt{n_e^2 \sin^2\theta(z) + n_o^2 \cos^2\theta(z)}} - n_o$$

When utilizing devices that evanescently interact with the NLC, the weighting function is described by an exponential decay from the boundary. As a result, the NLC near the interface is sampled more heavily, thus possibly leading to inaccurate results.

A need exists for improved beam steering techniques.

BRIEF SUMMARY

Described herein are methods for predicting the steering position of a variable index-based (liquid crystal based) non-mechanical beam steering device (a steerable evanescent electro-optic refractor or SEEOR) by measuring bulk parameters of the variable index material.

In a first embodiment, a waveguide apparatus includes a waveguide comprising a high-index core in contact with a variable-index liquid crystal (LC) cladding at a first interface, wherein a voltage applied to the LC cladding is effective to steer a beam of light passing through the high-index core; a low-index subcladding at a second interface; a voltage source configured to supply the voltage; and a measurement light source configured to direct light to reflect from the first interface and then to a receiver configured to measure bulk birefringence of the liquid crystal cladding.

In a second embodiment, a waveguide apparatus includes a waveguide comprising a high-index core in contact with a variable-index liquid crystal (LC) cladding at a first interface, wherein a voltage applied to the LC cladding is effective to steer a beam of light passing through the high-index core; a low-index subcladding at a second interface; a voltage source configured to supply the voltage; and a capacitance meter configured to measure capacitance across the LC.

In a third embodiment, a method of beam steering includes providing a waveguide apparatus according the first embodiment; passing the beam of through the waveguide; measuring the bulk birefringence of the LC using the measurement light source; and varying the voltage based on the bulk birefringence in order to steer the beam of light.

In a fourth embodiment, a method of beam steering includes providing a waveguide apparatus according to the second embodiment; passing the beam of through the waveguide; measuring the capacitance of the LC using the capacitance meter; and varying the voltage based on the capacitance in order to steer the beam of light.

BRIEF DESCRIPTION OF THE DRAWINGS

FIG. 2A is a top-down view of SEEOR steered by applying a voltage across a prism electrode. FIG. 2B is a cross-sectional side-view schematic of the SEEOR device, where the bulk of the LC is probed by polarized, single-wavelength light and the reflected beam is collected by a photodetector while the beam is steered.

FIG. 5A is a top-down view of SEEOR steered by applying a voltage across a prism electrode, while FIG. 5B is a cross-sectional side-view schematic of the SEEOR device, where the driver is replaced by an LCR meter (capable of measuring inductance (L), capacitance (C), and resistance (R)) that allows for a measurement of the capacitance during operation.

DETAILED DESCRIPTION

Definitions

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

Overview

In refractive beam steerers, where the NLC is probed only by the evanescent field, the graded index at the surface that results from an applied voltage is more heavily sampled than the bulk. This effect means that less of the field is being influenced by the full reorientation of the molecules that occurs at the center of the NLC bulk. Due to the elastic coupling between the surface and bulk orientation, it is possible to determine the distorted surface profile from careful bulk measurements. This results in a one-to-one mapping of bulk properties to surface-induced response. The two most easily measured voltage dependent bulk properties of the NLC that result from average molecular orientation are the birefringence, Δn, and the dielectric anisotropy, Δε.

Described herein is the implementation of LC device characterization techniques suited for transmissive electro-optic devices and effective to predict the behavior of new LC devices that only evanescently probe the LC. These allow for predictive steering as well as performance monitoring.

Measurements of LC characteristics made as described herein can be received, for example using computer hardware and software, to direct an appropriate driving voltage in order to steer a beam of light passing through a waveguide. It is contemplated that this invention can aid in beam stability, for example by allowing for real-time compensation for drifting, oscillation, etc.

Examples

Figure 1B:
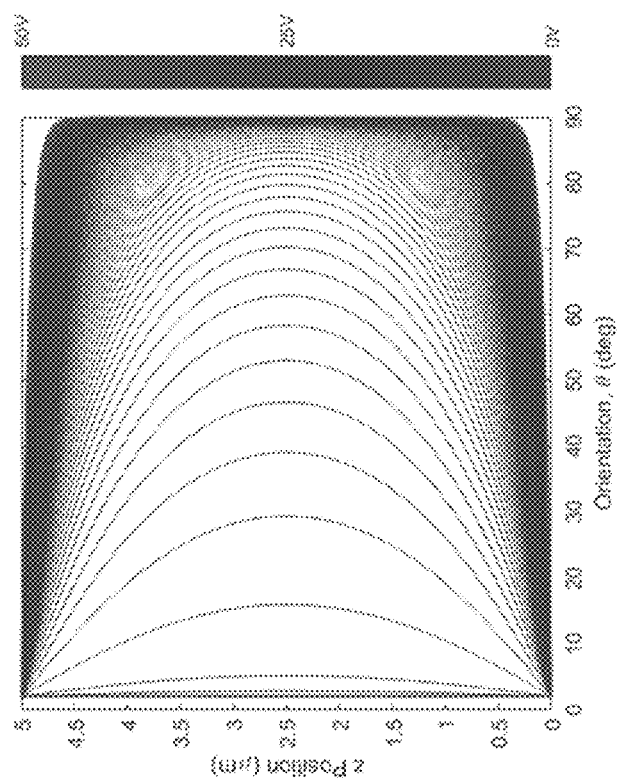
FIG. 1B is a simulation of the LC director orientation within the cell with varying voltage.
Figure 1A:
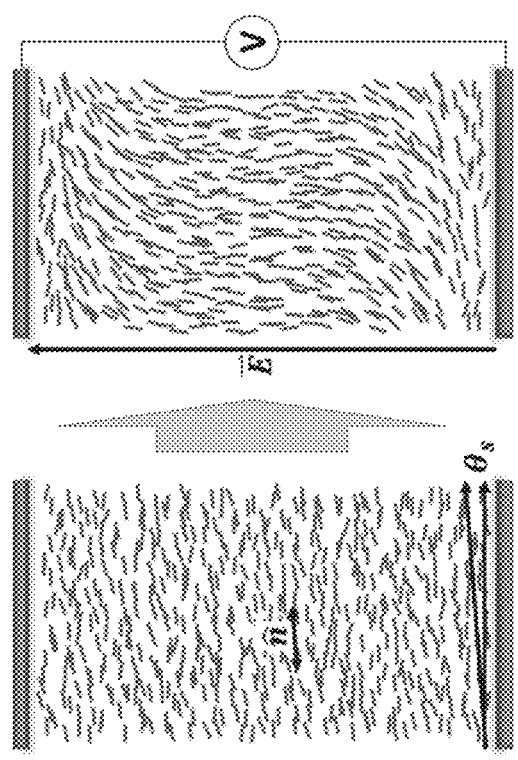
FIG. 1A is a schematic of LC orientation within the cell before (left) and after (right) a voltage is applied. The orientation in each voxel of the NLC is described by the director n̂, the pretilt angle induced by the surface is $\theta_s$, and an applied voltage V induces an electric field $\vec{E}$ that reorients the NLC.
Figure 2A:
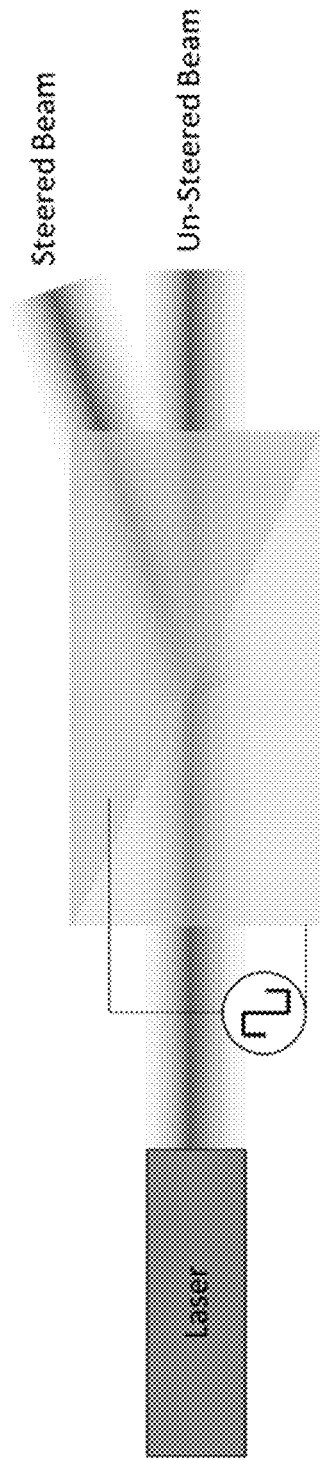
FIGS. 2A and 2B are schematic diagrams of one embodiment.
Figure 2B:
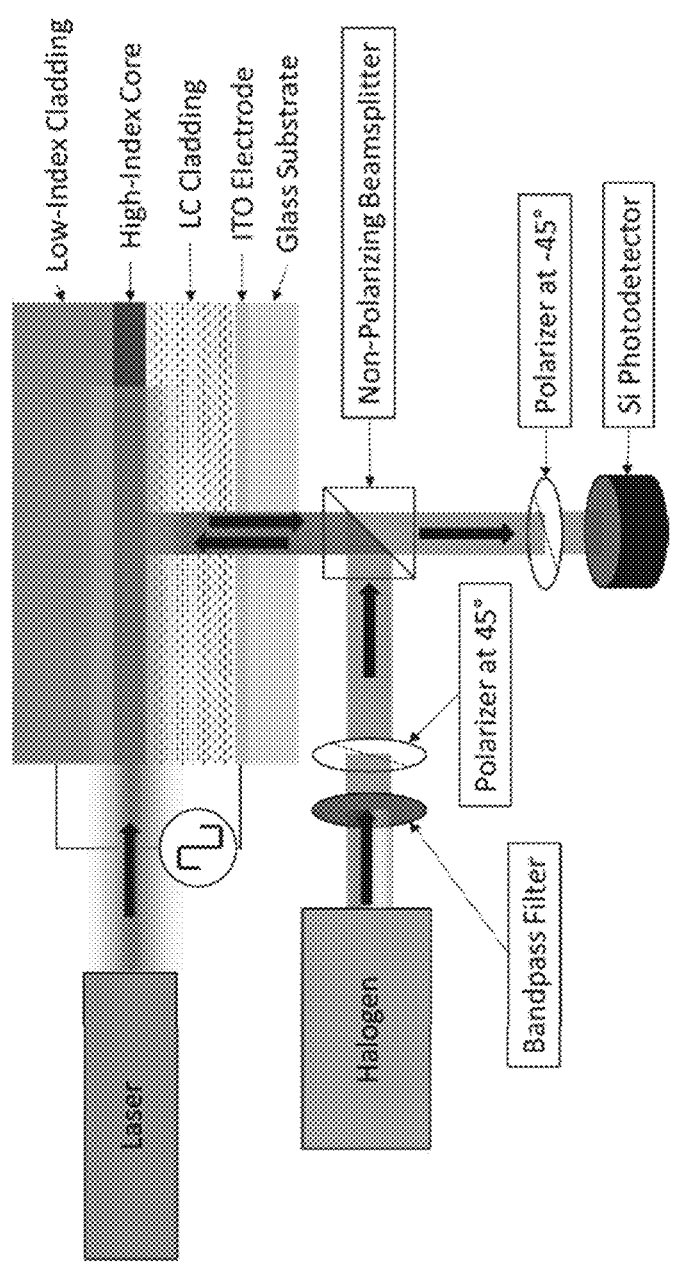

In one embodiment, illustrated schematically in FIGS. 2A and 2B, the bulk birefringence of the liquid crystal is measured using a single wavelength of light. The device is mounted on an inverted microscope and probed using polarized reflection optical microscopy. A square wave voltage is applied across the LC using a custom driver. Incident light from a halogen lamp, polarized at a 45° angle to the alignment of the LC, passes through the transparent ITO prism electrode and LC, and reflects off the waveguide interface. The reflected light passes through a polarizer oriented at 90° from the first polarizer before being collected by a high-speed Si detector. A notch filter is used to isolate 653 nm wavelength light with a 30 nm bandwidth, which was verified using an OceanOptics Flame Spectrometer.

Figure 3B:
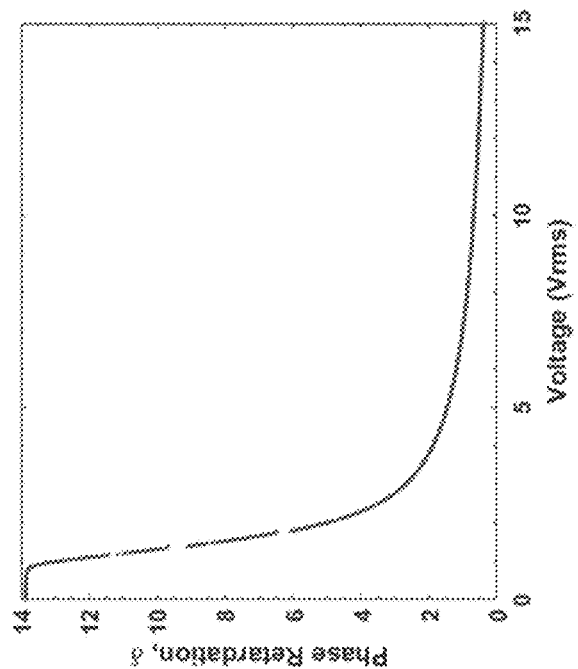
FIG. 3B shows that the optical signal can be unwound to give the phase retardation as a function of voltage.
Figure 3A:
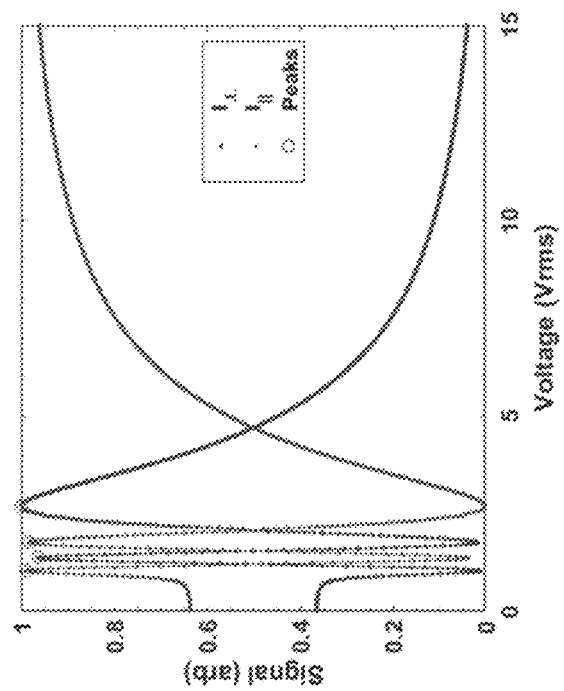
FIG. 3A shows how the parallel and perpendicular components of the light reflected from an NLC cell vary as a voltage is applied and the effective birefringence decreases. The peaks of the blue curve show where the light is polarized perpendicular to the polarizer. The peaks of the green curve show where the light is polarized parallel to the polarizer.

As a voltage is applied across the liquid crystal, the reflected intensity viewed between crossed-polarizers oscillates. The oscillation can be unwound reliably into a phase retardation using the equations $$\delta = 2\pi m + 2\tan^{-1}\left(\sqrt{I_\perp / I_\parallel}\right) \quad m = 0, 1, 2, \ldots$$

$$\delta = 2\pi(m+1) - 2\tan^{-1}\sqrt{I_\perp / I_\parallel} \quad m = 0, 1, 2, \ldots$$

where the value m is dictated by the position of peaks and troughs of the optical signal [12]. An example of this process is shown in FIG. 3.

The effective birefringence is given by $$\Delta n = \frac{\lambda}{2\pi d}\delta$$

Operation of the above embodiments was tested with prototypes. A SEEOR device was composed of a slab waveguide with a high-index $As_2S_3$ core, a low-index $As_2S_3$ subcladding, and a variable-index TL-213 LC cladding. An Indium Tin Oxide (ITO) prism electrode was placed at the LC interface, across from the waveguide core. The waveguide core was rubbed with felt to create nanogrooves at the interface [13], which aligns the LC homogeneously along the short axis of the waveguide. When a voltage was applied across the prism electrode, the LC reoriented with the field leading to an effective change in index. A Mid-Wave Infra-Red (MWIR) laser was coupled into the device and the steering of the outcoupled beam was measured by observing the position of the out-coupled spot on a target a calibrated distance from the SEEOR exit facet with a FUR MWIR camera.

Figure 4B:
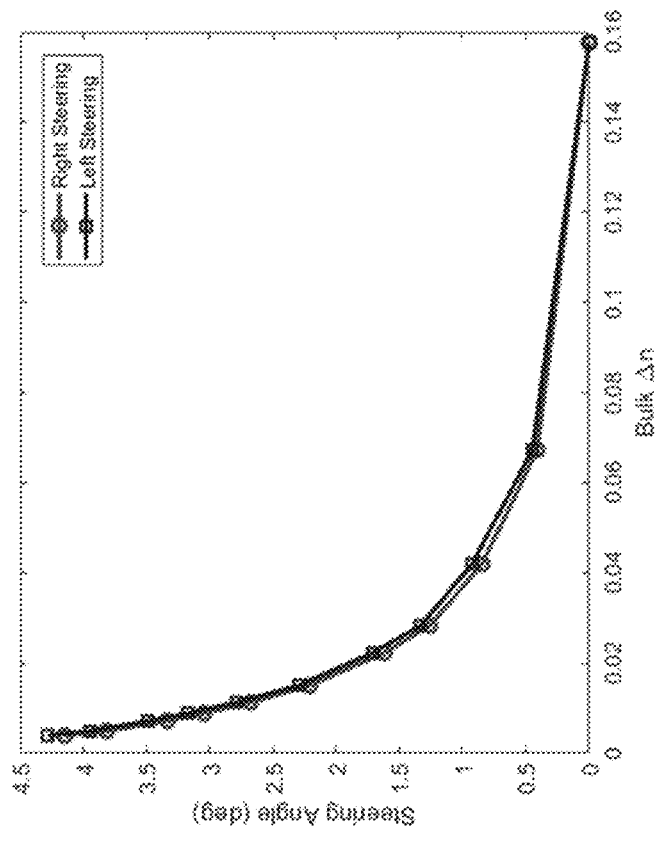
FIG. 4B is a plot of steering angle as a function of bulk birefringence, showing that it is possible to determine a relationship between them.
Figure 4A:
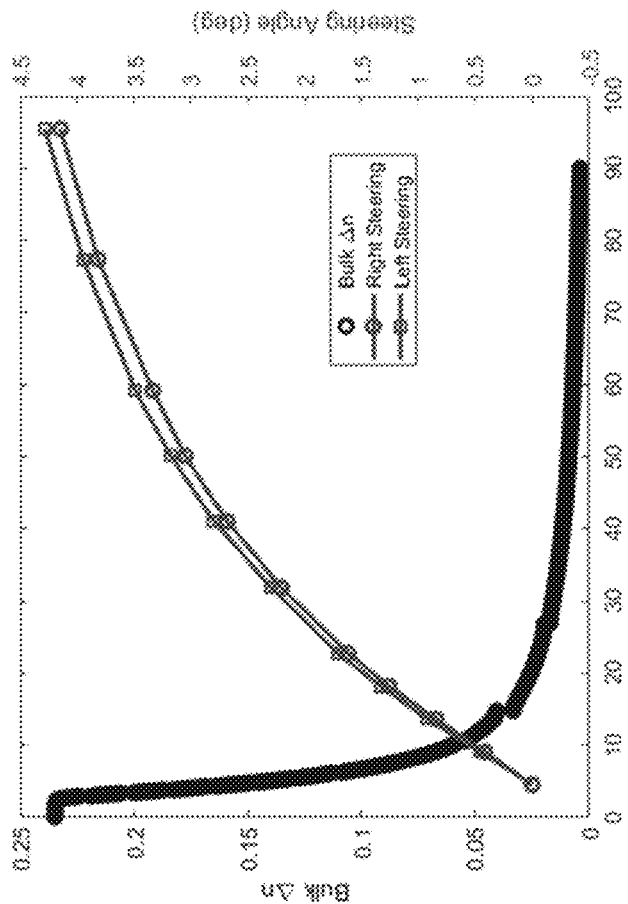
FIG. 4A shows bulk birefringence and steering plotted together, demonstrating their one-to-one correspondence.

A comparison of bulk and surface measurements and their one-to-one mapping are shown in FIG. 4A. An interpolation curve for steering as a function of bulk birefringence can be fit from the curve in FIG. 4B.

Figure 5A:
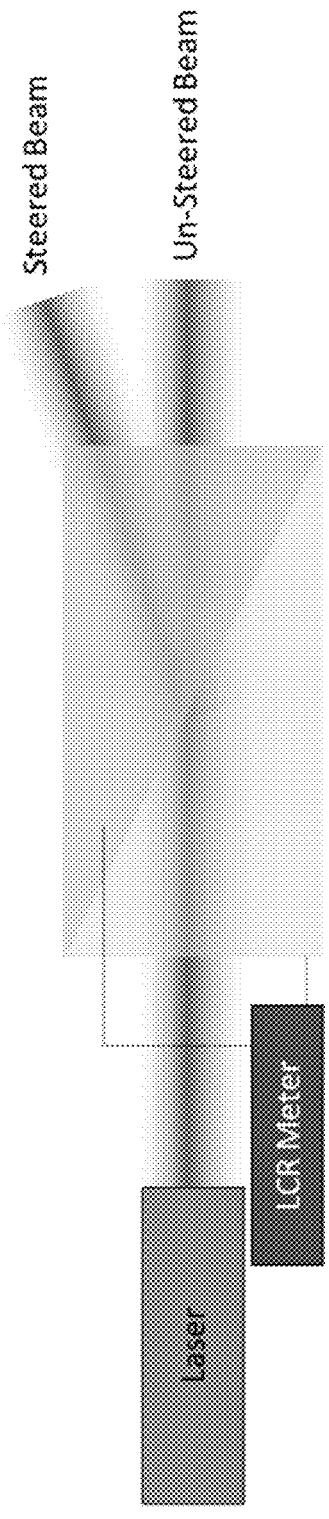
FIGS. 5A and 5B are schematic diagrams of a further embodiment.
Figure 5B:
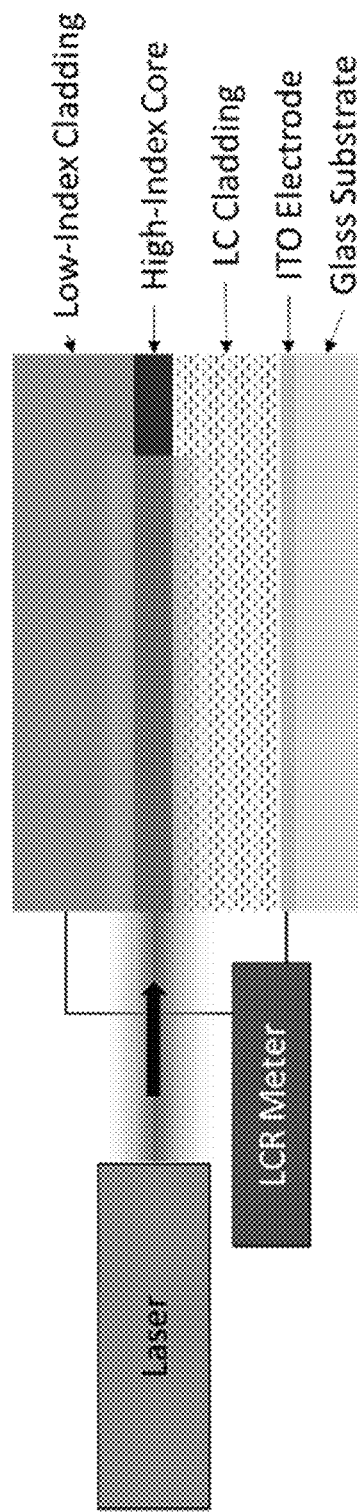

In another embodiment, the liquid crystal is driven using an LCR meter as shown in FIGS. 5A and 5B. The LCR meter measures the capacitance of the liquid crystal at each drive voltage. The total capacitance is a function of the average dielectric constant, which is related to the deformation of the liquid crystal director.

Operation of the above embodiments was again tested with the SEEOR device described above. The electrodes that are used to steer the device were connected to a HP 4284A Precision LCR Meter. Steering angle was recorded as the test voltage on the LC cell was ramped using a sine wave from 0.1 to 20 Vrms. The temperature of the SEEOR was measured using thermocouples on both sides of the device. Heating was achieved by running a set current through a resistive heater placed against the device.

Figure 6B:
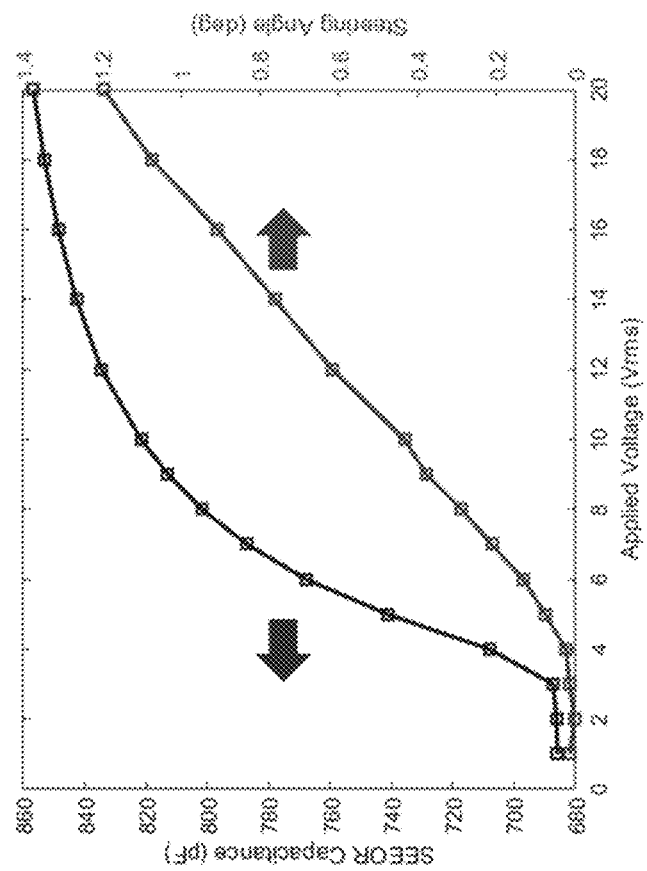
FIGS. 6A and 6B are plots of (a) the beam position and measured capacitance as a function of the applied voltage; and (b) the beam position as a function of measured capacitance. The two measured values show a 1 to 1 mapping.
Figure 6A:
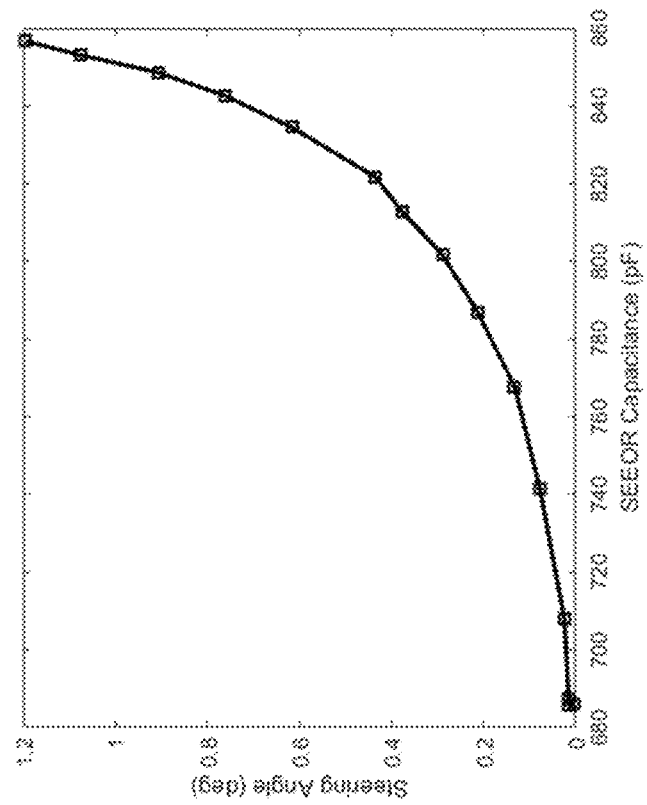

At a set temperature, the capacitance and steering angle can be correlated with a one-to-one mapping. This is shown in FIG. 6.

Figure 7B:
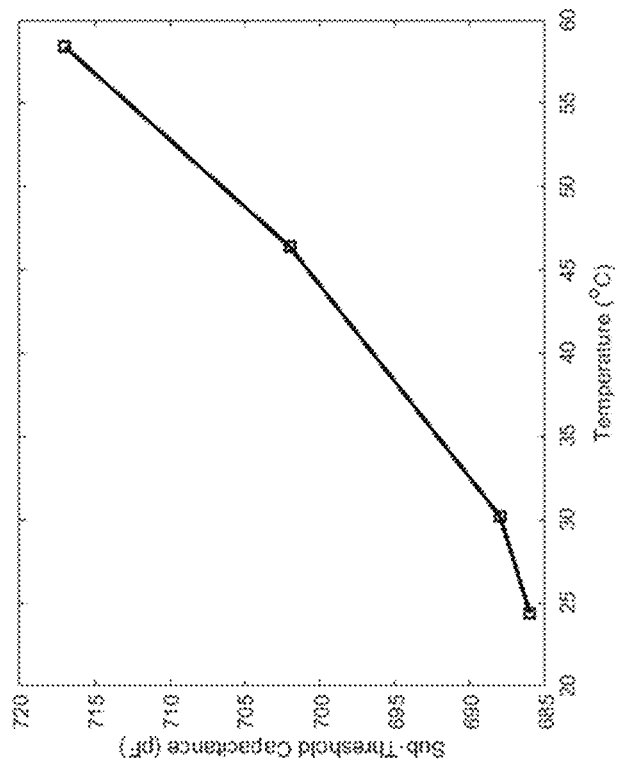
FIGS. 7A and 7B are plots of (a) the measured capacitance as a function of applied voltage as the SEEOR device is heated; and (b) the measured sub-threshold capacitance as a function of the device temperature.
Figure 7A:
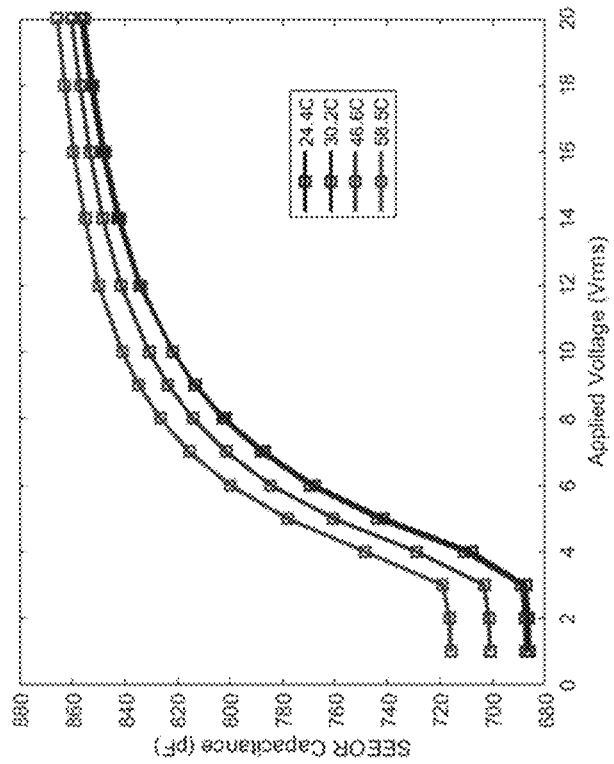

The correlation between capacitance and steering angle is generally temperature dependent, as both the NLC properties and the anchoring energy change with temperature. Therefore it is important to have an accurate measure of the temperature in the NLC. This can be achieved by measuring the capacitance at a voltage below the NLC threshold voltage, $V_{th}$. FIG. 7 shows how the capacitance vs. voltage curves change as the temperature is increased.

Further Embodiments

In embodiments, beam steering is accomplished without the use of one or more of the following approaches: the use of a look-up tables, the reading of pick-off signals from the output beam, and the estimation of device internal temperature by monitoring of the surface of the device.

The illuminating light source may be a single-wavelength LED or laser to reduce the size, weight, and power (SwaP) requirements of the system.

These techniques can be used with wavelengths of light where the LC is active, for example ultraviolet, visible, near infrared (IR), short wave IR (SWIR), and/or long wave IR (LWIR).

Waveguide architectures where the light is confined in a high-index core can be employed, as a leaky or non-leaky mode and independent of the in-coupling method (it need not be a prism as in the exemplary embodiments, but instead can be a grating or end-coupled).

The techniques might be employed in various types of devices where LC is used to direct energy traveling through a material, such as plasmonic, photonic and photovoltaic devices.

Bulk birefringence can be measured using other optical methods including, but not limited to, looking at the reflected signal when illuminated by a spectrally-nonsingular light source and directly or indirectly measuring the distance between interference peaks.

Bulk birefringence can be measured to determine temperature of the NLC.

The active layer need not be liquid crystal and can be used with other optically transparent variable-birefringence materials, including but not limited to phase change material and crystalline and polymeric materials that display Pockels or Kerr effects such as lithium niobate.

Capacitance measurement below the NLC threshold voltage may be used as a temperature sensor within the LC, eliminating the need for an external thermal sensor.

Capacitance can be measured by other instruments, and need not necessarily be measured by an LCR meter.

The technique is also suitable for SEEORs designed to work in optical bands other than the MWIR, including the SWIR, NIR, VIS, UV and LWIR.

If the substrate and waveguide are transparent to the bulk probing wavelength, the birefringence of the NLC can be measured from the top, or substrate side, of the waveguide.

The optical probing region can be in the active region of the waveguide, where the propagating beam is interaction with the NLC, or in a separate probing region that is not utilized for beam steering.

The method is not limited to waveguides; bulk monitoring can be used in applications where the evanescent field is utilized including, but not limited to, plasmonic and photonic devices and photovoltaics.

Advantages

This technique predicts the position of a steered beam before the beam is incident on a target with the need for an external lookup table to determine the steering angle. Furthermore, it monitors the external temperature of the liquid crystal.

Concluding Remarks

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

REFERENCES

1. N. Konforti, E. Marom, and S.-T. Wu, "Phase-only modulation with twisted nematic liquid-crystal spatial light modulators," Opt. Lett. 13, 251-253 (1988).
2. J. A. Davis, D. E. Mcnamara, D. M. Cottrell, and T. Sonehara, "Two-Dimensional Polarization Encoding with a Phase-Only Liquid-Crystal Spatial Light Modulator," Appl. Opt. 39, 1549-1554 (2000).
3. S.-T. Wu and C.-S. Wu, "Small angle relaxation of highly deformed nematic liquid crystals," Appl. Phys. Lett. J. Appl. Phys. 53, 1794-1796 (1988).
4. P. F. Mcmanamon, S. Member, T. A. Dorschner, D. L. Corkum, L. J. Friedman, D. S. Hobbs, M. Holz, S. Liberman, H. U. Y. Q. Nguyen, D. P. Resler, R. C. Sharp, and E. A. Watson, "Optical Phased Array Technology," Proc. IEEE. 84, 268-298 (1996).
5. J. Kim, C. Oh, M. J. Escuti, L. Hosting, and S. Serati, "Wide-angle nonmechanical beam steering using thin liquid crystal polarization gratings," in Optical Engineering+Applications, J. D. Gonglewski, R. A. Carreras, and T. A. Rhoadarmer, eds. (International Society for Optics and Photonics, 2008), pp. 709302-709302-12.
6. R. K. Komanduri and M. J. Escuti, "High efficiency reflective liquid crystal polarization gratings," Appl. Phys. Lett. 95, 1-4 (2009).
7. J. Kim, M. N. Miskiewicz, S. Serati, and M. J. Escuti, "Nonmechanical Laser Beam Steering Based on Polymer Polarization Gratings: Design Optimization and Demonstration," J. Light. Technol. 33, 2068-2077 (2015).
8. S. R. Davis, G. Farca, S. D. Rommel, A. W. Martin, and M. H. Anderson, "Analog, non-mechanical beam-steerer with 80 degree field of regard," in SPIE Defense and Security Symposium, S. L. Chodos and W. E. Thompson, eds. (International Society for Optics and Photonics, 2008), p. 69710G.
9. S. R. Davis, G. Farca, S. D. Rommel, S. Johnson, and M. H. Anderson, "Liquid crystal waveguides: new devices enabled by >1000 waves of optical phase control," in Proc. SPIE Vol. 7618, L.-C. Chien, ed. (2010), p. 76180E.
10. J. A. Frantz, J. D. Myers, R. Y. Bekele, C. M. Spillmann, J. Naciri, J. Kolacz, H. G. Gotjen, V. Q. Nguyen, C. C. McClain, L. B. Shaw, and J. S. Sanghera, "Chip-based nonmechanical beam steerer in the midwave infrared," J. Opt. Soc. Am. B 35, C29-C37 (2017).
11. A. Jakli and A. Saupe, One- and Two-Dimensional Fluids: Properties of Smectic, Lamellar and Columnar Liquid Crystals (CRC Press, 2006).
12. I. C. Khoo and S.-T. Wu, Optics and Nonlinear Optics of Liquid Crystals (World Scientific, 1993).
13. J. A. Frantz, J. D. Myers, C. M. Spillmann, J. Naciri, B. R. Ratna, L. B. Shaw, J. S. Sanghera, R. Y. Bekele, and J. Kolacz, "Liquid Crystal Alignment on Chalcogenide Glass," U.S. patent US 2018/0024413 A1 (2018).

What is claimed is:

1. A waveguide apparatus comprising:
a waveguide comprising a high-index core in contact with a variable-index liquid crystal (LC) cladding at a first interface, wherein a voltage applied to the LC cladding is effective to steer a beam of light passing through the high-index core;
a low-index subcladding at a second interface;
a voltage source configured to supply the voltage; and
a measurement light source configured to direct light to reflect from the first interface and then to a receiver configured to measure bulk birefringence of the liquid crystal cladding, wherein this light enters a bulk of the liquid crystal cladding by passing substantially orthogonally to the beam of light passing through the core.

2. The apparatus of claim 1, further comprising an electrode attached to the LC cladding.

3. The apparatus of claim 1, wherein the high-index core is configured to carry infrared light and the measurement light source provides visible light.

4. A waveguide apparatus comprising:
a waveguide comprising a high-index core in contact with a variable-index liquid crystal (LC) cladding at a first interface, wherein a voltage applied to the LC cladding is effective to steer a beam of light passing through the high-index core;
a low-index subcladding at a second interface;
a voltage source configured to supply the voltage; and
a capacitance meter configured to measure capacitance across a bulk of the LC in a direction substantially orthogonal to the direction of the beam of light.

5. The apparatus of claim 4, further comprising an electrode attached to the LC cladding.

6. The apparatus of claim 4, wherein the high-index core is configured to carry infrared light.

7. A method of beam steering comprising:
providing a waveguide apparatus comprising a waveguide that in turn comprises a high-index core in contact with a variable-index liquid crystal (LC) cladding at a first interface, wherein a voltage applied to the LC cladding is effective to steer a beam of light passing through the high-index core; a low-index subcladding at a second interface; a voltage source configured to supply the voltage; and a measurement light source configured to direct light to reflect from the first interface and then to a receiver configured to measure bulk birefringence of the liquid crystal cladding;
passing the beam through the waveguide;
measuring the bulk birefringence of the LC using the measurement light source; and
varying the voltage based on the bulk birefringence in order to steer the beam of light.

8. The method of claim 7, wherein the beam of light passing through the waveguide is infrared light and the measurement light source provides visible light.

9. A method of beam steering comprising:
providing a waveguide apparatus providing a waveguide apparatus comprising a waveguide that in turn comprises a waveguide comprising a high-index core in contact with a variable-index liquid crystal (LC) cladding at a first interface, wherein a voltage applied to the LC cladding is effective to steer a beam of light passing through the high-index core; a low-index subcladding at a second interface; a voltage source configured to supply the voltage; and a capacitance meter configured to measure capacitance across a bulk of the LC in a direction substantially orthogonal to the direction of the beam of light;
passing the beam through the waveguide;
measuring the capacitance of the LC using the capacitance meter; and
varying the voltage based on the capacitance in order to steer the beam of light.

10. The method of claim 9, wherein the high-index core is configured to carry infrared light.

* * * * *